United States Patent [19]
Jin et al.

[11] Patent Number: 5,964,904
[45] Date of Patent: Oct. 12, 1999

[54] METHOD OF MAKING AN ARTICLE THAT COMPRISES DISPERSION-HARDENED LEAD

[75] Inventors: Sungho Jin, Millington; Brijesh Vyas, Warren, both of N.J.; Susan M. Zahurak, Lebanon, Pa.

[73] Assignee: Lucent Technologies Inc., Murray Hill, N.J.

[21] Appl. No.: 09/219,466

[22] Filed: Dec. 23, 1998

Related U.S. Application Data

[62] Division of application No. 08/614,425, Mar. 12, 1996, abandoned.

[51] Int. Cl.$^6$ .............................. B21D 39/00; H01M 4/22
[52] U.S. Cl. ................................ 29/623.5; 29/2; 29/17.2; 29/514
[58] Field of Search .................... 29/623.5, 17.2, 29/469.5, 514, 2; 141/1.1

[56] References Cited

PUBLICATIONS

English language abstract of Y. Ueda, et al, *Journal of the Japan Institute of Metals*, vol. 42(8), pp. 751–756, 1978, (no month).

V.V. Neverov et al., *Soviet Powder Metallurgy and Metal Ceramics*, vol. 31 (10), pp. 894–897, Oct. 1992.
D.H. Roberts et al., *Metallurgia*, Nov. 1964, pp. 223–227.
G.H. Reynolds, *Scripta Metallurgia*, vol. 8, pp. 781–784. Note: only p. 781 is currently available, Apr. 1974.
English language abstract of H. Unckel, *Metall*, vol. 35(7). pp. 553–558, (no date).
English language abstract of French Patent No. 1,480,049 (May 05, 1967).
English language abstract of French Patent No. 2,128,914 (Feb. 09, 1973).

*Primary Examiner*—John S. Maples
*Attorney, Agent, or Firm*—Eugen E. Pacher

[57] ABSTRACT

A lead-acid battery according to the invention contains an electrode grid structure that comprises dispersoid-containing lead having relatively high strength and good corrosion resistance. The dispersoid particles exemplarily are selected from the oxides, nitrides and carbides that are substantially insoluble in lead and in sulfuric acid of concentration suitable for use in a lead-acid battery. Significantly, the dispersoid-containing lead has average grain size of at least 20 $\mu$m. In consequence of the relatively large grain size, the total length of grain boundaries exposed to electrolyte is relatively small, and corrosion resistance is improved. Exemplary techniques for forming the dispersoid-containing lead are disclosed.

11 Claims, 4 Drawing Sheets

50 μm

} SURFACE Pb

DISPERSION-
HARDENED Pb

50 μm

METHOD OF MAKING AN ARTICLE THAT COMPRISES DISPERSION-HARDENED LEAD

RELATED APPLICATION

This application is a divisional under 37 CFR 1.60 of application Ser. No. 08/614,425, filed Mar. 12, 1996 by S. Jin et al. now abandoned. This application is related to application Ser. No. 08/614,424, filed concurrently with the parent application of the instant division application and now abandoned.

FIELD OF THE INVENTION

This invention pertains to lead-acid batteries, more specifically, to electrode grid structures for such batteries, and to methods of making the structures.

BACKGROUND OF THE INVENTION

The technology of lead-acid storage batteries is now quite mature. However, despite a great deal of work done towards improving such batteries, there still exist problems. For instance, it is known that pure Pb is relatively corrosion resistant under the conditions that exist in the battery, and thus pure Pb electrode grid structures are widely used. However, pure Pb is soft and mechanically weak, necessitating use of relatively massive electrode grid structures. Consequently, lead-acid batteries with pure Pb electrode grid structures typically have relatively low value of stored energy per unit weight.

By way of further example, it is known that lead alloys can have substantially greater strength than pure lead, and lead-acid batteries with lead alloy (e.g., precipitation hardened Pb-Ca-Sn) electrode grid structures are also widely used. These batteries typically have a higher value of stored energy per unit weight, compared to the above discussed battery type. However, the lead alloy electrode grid structures typically have relatively low corrosion resistance, and batteries that comprise lead alloy electrode grid structures consequently typically have relatively short life time.

In view of the great importance of lead-acid storage batteries, it would be highly desirable to have available a battery that comprises a relatively light weight electrode grid structure that also is relatively resistant to corrosion under the conditions that exist in the battery, and thus could combine a relatively high value of stored energy per unit weight with relatively good corrosion resistance. This application discloses such a battery, and a method of making the battery.

SUMMARY OF THE INVENTION

The invention is embodied in an article (typically a lead-acid storage battery) that comprises a body (typically an electrode grid structure) that comprises dispersion-hardened lead. The dispersion-hardened lead comprises dispersoid particles (exemplarily substantially spherical, but not excluding flake-or fiber-shaped particles or generally irregularly-shaped particles) selected from the inorganic materials that are substantially insoluble in Pb and in sulfuric acid, both at temperatures (and, where applicable, concentrations), encountered during normal operation of conventional lead-acid batteries. The temperature range typically is −20 to +70° C., and the concentration range typically is 15–45% by weight. Exemplarily, the inorganic materials are substantially insoluble in Pb at 70° C., and in 45% by weight sulfuric acid at 70° C. Typically the particles are selected from the oxides, nitrides and carbides, with the oxides including such Pb-containing complex (i.e., containing more than one metallic element) oxides as $PbSnO_3$, $PbTiO_3$, and $BaPbO_3$. Note that the simple Pb-oxides (e.g., PbO) generally do not meet the criterion of substantial insolubility in Pb. The dispersoid particles generally are distributed throughout the dispersion-hardened lead. Significantly, the dispersion-hardened lead has an average grain size of at least 20 μm, preferably greater than 50 μm.

By "substantially insoluble" in a given medium we mean herein solid or liquid solubility less than 0.5 atomic %, preferably less than 0.1 atomic %.

The relatively large grain size is obtained by a heat treatment, and results in increased corrosion resistance of the dispersion-hardened lead according to the invention, as compared to prior art lead composites.

The invention is also embodied in a method of making an article that comprises a dispersion-hardened grid lead member, typically an electrode structure. Significantly, the method comprises forming a mass that comprises the above-specified dispersoid particles and lead, mechanically deforming the mass such that the dispersoid particles are distributed throughout at least a portion of the mass, heat treating at least said portion such that at least the portion comprises dispersion-hardened lead with average grain size of at least 20 μm, forming the dispersion-hardened lead member from at least the portion, and carrying out one or more further steps towards completion of the article (typically a lead-acid battery). The one or more further steps can be conventional, e.g., attaching active material (e.g., $PbO_2$, $PbSO_4$, Pb) to the electrode grid structure, assembling electrodes in a housing, providing electrical connections, and providing electrolyte.

DETAILED DESCRIPTION OF SOME PREFERRED EMBODIMENTS

The inventive dispersion-hardened lead is made by a process that comprises forming a substantially uniform distribution of the dispersoid particles in substantially pure (typically >98%, preferably 99.5 or better) lead. The volume fraction of dispersoid particles typically is in the range 0.5–20%, preferably 1–10%. Exemplary of particles that can be used in the practice of the invention are $TiO_2$, $ZrO_2$, $Al_2O_3$, $PbSnO_3$, $PbTiO_3$, $BaPbO_3$, TiN, ZrN, AlN, TiC, ZrC, HfC, diamond, and rare earth (atomic numbers 57–71) oxides, nitrides and carbides.

The lead with substantially uniformly distributed dispersoid particles therein can be produced by any suitable method. An exemplary method comprises provision of Pb powder, and mixing the Pb powder with the dispersoid particles. The lead particle size typically is in the range 10–1000 μm, preferably 20–200 μm. Substantially larger particle size requires undesirably extensive plastic deformation, and substantially smaller particle size makes safe handling more difficult. By "particle size" of substantially three-dimensional particles we mean the diameter of a sphere of equal volume as the particle, whereas the particle size of substantially two-dimensional particles (eg., flakes) and substantially one-dimensional particles (e.g., fibers) is the width of the particles.

Figure 1:
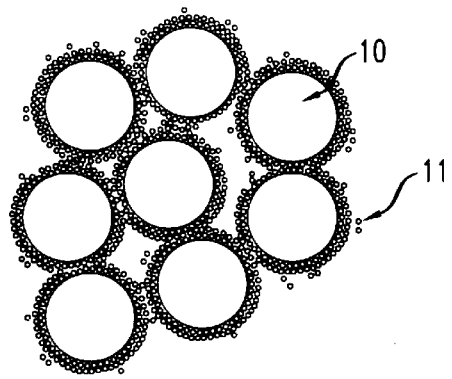
FIGS. 1–3 schematically illustrate stages in the formation of dispersoid-containing lead using lead powder.

The particle size of the dispersoid material advantageously is chosen to be substantially smaller (typically less than 10%) than the Pb powder size, such that, after mixing of the powders, the lead particles will be coated with dispersoid particles, as is schematically depicted in FIG. 1.

The powders can be mixed by any appropriate technique, including dry mixing. We currently prefer wet mixing, using a volatile liquid such as alcohol, acetone or, less preferably, water, as the mixing medium. Preferably the volume fraction of liquid is in the range 10–40%, to provide for sufficient inter-particle friction to avoid substantial gravity-induced segregation. FIG. 1 schematically depicts the mixture, with numerals 10 and 11 referring, respectively, to Pb and dispersoid particles.

If a wet mixing technique is used then the powder aggregate is dried, exemplarily in ambient air, in an inert atmosphere or under vacuum.

Subsequently the dry powder mixture is densified into a coherent porous body, exemplarily by compaction with, e.g., a hydraulic press, by cold rolling or forging.

Figure 2:
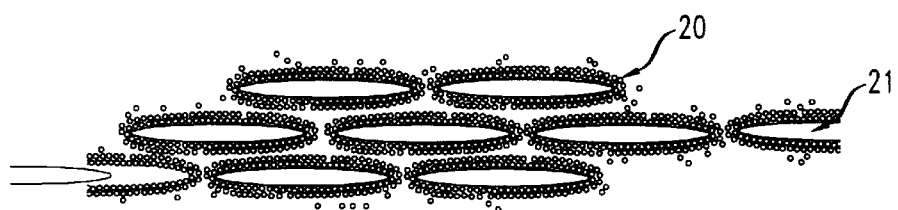

The resulting material is schematically shown in FIG. 2, wherein numerals 20 and 21 refer, respectively to the deformed Pb particles and the dispersoid particles.

Densification (at least the early stage thereof) is desirably carried out such that the pores in the material are substantially free of air, to avoid oxidation of internal surfaces and bubbling or expansion of trapped gas during subsequent heat treatment. Thus, densification in vacuum is currently preferred, although densification in an inert atmosphere may be acceptable in some cases.

Figure 3:
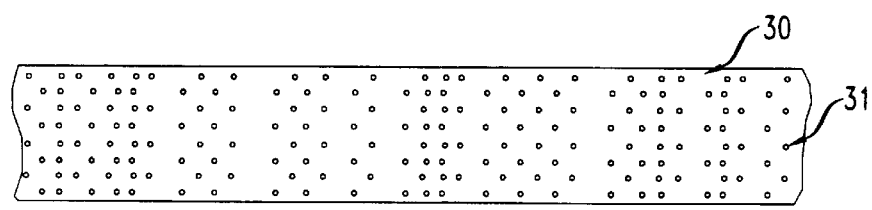

Densification will typically involve a substantial amount of plastic deformation (at least 50% cross section reduction, preferably at least 90 or 95%). In order to substantially attain uniform dispersoid distribution, the amount of deformation desirably is selected to yield an average distance between dispersoid particles in the thickness direction of at most 10 (preferably at most 3) times the average dispersoid particle size. The deformation need not be uniaxial, but could involve a repeated pressing/expanding process in any direction, analogous to kneading of dough. FIG. 3 schematically depicts highly densified material, with numerals 30 and 31 referring, respectively, to the lead matrix and the dispersoid particles.

The thus produced dispersion-hardened lead according to the invention can be shaped as required, e.g., into plates or strips. This can be accomplished by conventional techniques, e.g., cold or warm rolling, swaging into rods, followed by roll flattening, or by shearing into short sections, stacking and further rolling.

A further exemplary method of making dispersion-hardened lead according to the invention comprises providing a quantity of substantially pure (>98%, typically >99.5%) solid lead in sheet-form (thickness exemplarily in the range 0.005–0.25 inches, preferably 0.01–0.1 inches). Because of the mechanical softness of substantially pure lead, it may be desirable to use work-hardened sheets. Thus, an initial cold rolling treatment may be desirable. In order to facilitate the subsequent processing, cleaning of the surface of the lead sheet will also be desirable.

Figure 4:
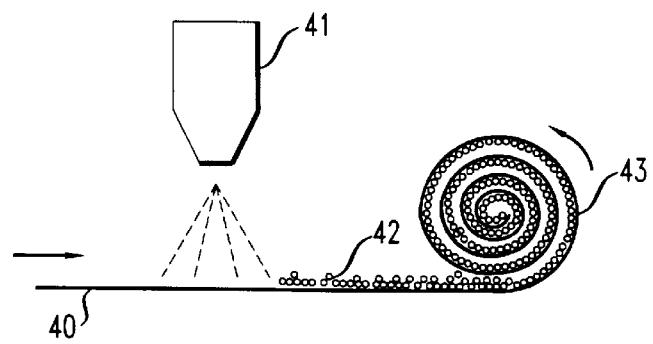
FIGS. 4–7 schematically depict stages in the formation of dispersoid-containing lead using lead sheet.

Subsequently, one or both surfaces of the lead sheet are coated with dispersoid particles of the above-described type, in an amount to yield a volume fraction in the above recited range. Coating can be carried out by any appropriate technique, e.g., spray coating of the particles in a volatile liquid such as alcohol, acetone or water, dip coating, brush painting, roller painting or electrophoretic or electrostatic attachment. If appropriate, the carrier liquid is removed after coating. FIG. 4 schematically shows coating of lead sheet 40 with dispersoid particle layer 42 by means of spray coater 41. The coated sheet is wound into coil ingot 43.

Figure 5:
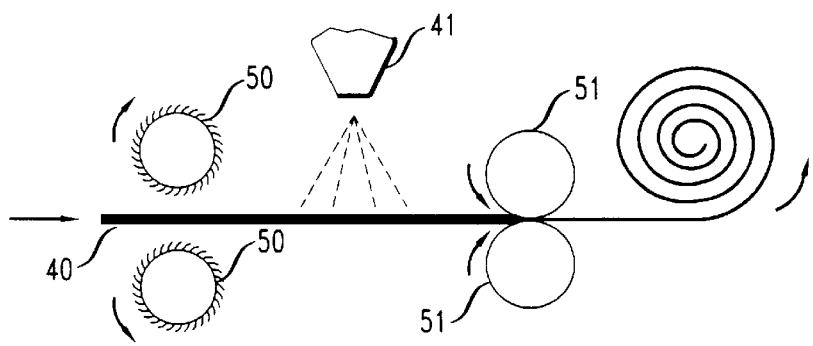
Figure 6:
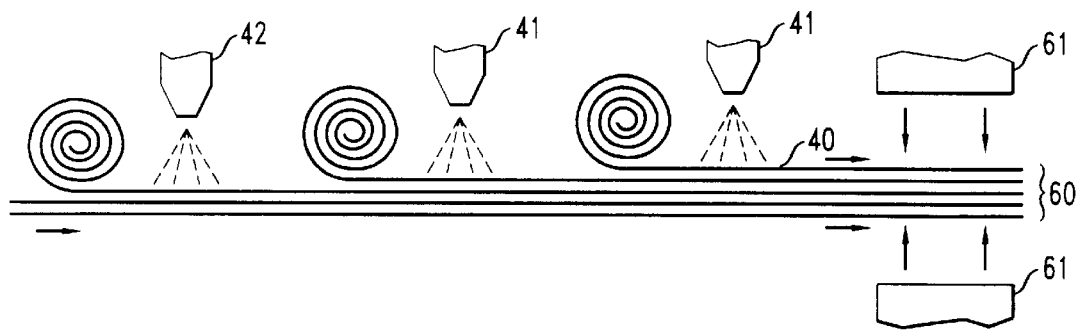

FIG. 5 schematically depicts a further exemplary coating technique, wherein metal shavers or grinders 50 create fresh surfaces of lead sheet 40, and rollers 51 serve to attach the dispersoid layer (not shown) to the lead sheet. A still further exemplary technique is illustrated in FIG. 6, wherein a stack (60) of coated lead sheets is formed, and is bonded together by press 61.

Figure 7:
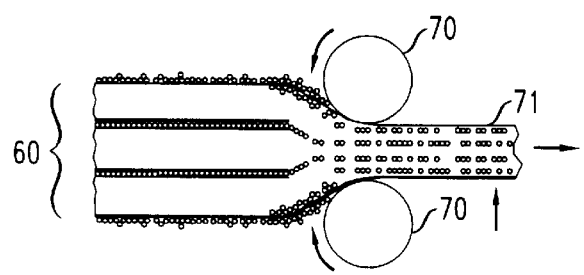

The ingot-like or stack-like composite preform that results from the coating step is then processed to form a material having a coherent lead matrix with a substantially uniform distribution of dispersoid particles. This processing exemplarily involves cold or warm rolling to reduce the inter-layer distance and to make the dispersoid particles to come closer in the thickness direction of the resulting composite sheet. This is schematically illustrated in FIG. 7, wherein rollers 70 serve to compact stack 60 of dispersoid-coated lead sheets into material 71, a lamination-bonded lead-dispersoid composite.

Those skilled in the art will appreciate that the preform typically comprises many (e.g., 10–10,000) layers of coated lead sheet. Alternatively, a smaller number of layers can be stacked or wound up, rolled, and restacked, with many repetitions.

The lamination-bonded lead-dispersoid composite will be worked, in any appropriate manner, until composite material having a substantially uniform distribution of dispersoid particles in a lead matrix results. It may be desirable to carry out at least one or more early working steps in vacuum, or to evacuate pores and back-fill them with inert gas.

By way of example, a roughly 10 inch high stack of 500 layers of 0.02 inch thick Pb sheets, each coated with a 0.001–0.002 inches thick layer of 2 $\mu$m $TiO_2$ particles (about 5% by volume) is worked to yield a 0.020 inch thick sheet of material (about 99.8% reduction in area, or 1/500 reduction in thickness). The thickness of each initial sheet (and hence the inter-particle spacing in the thickness direction) is reduced to about 1 $\mu$m, which is of the same order of magnitude as the size of the dispersoid particles. Note that an ideal, uniform, three-dimensional distribution of 5% by volume of 2 $\mu$m particles gives rise to a calculated inter-particle distance of 5–6 $\mu$m. Thus, the above example shows that a substantially uniform dispersoid distribution is readily attainable by a lamination/dispersion technique.

Figure 8:
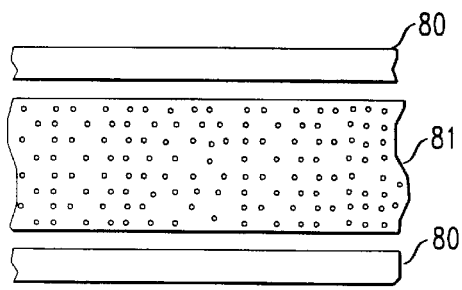
FIGS. 8 and 9 schematically illustrate an exemplary technique of providing a dispersoid-containing lead sheet with a lead coating.
Figure 9:
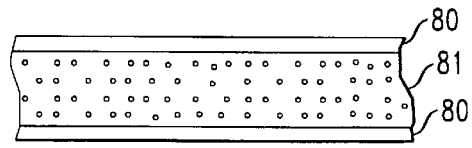

In order to still further improve the corrosion resistance of bodies that comprise dispersion-hardened lead according to the invention, it may at times be desirable to provide material having a dispersion-hardened lead core sandwiched between dispersoid-free lead surface layers. These optional surface layers can be applied by any appropriate process (e.g., electroplating, rapid dipping in molten lead, plasma deposition or flame spray deposition). See also the above referred-to concurrently filed patent application. FIG. 8 schematically illustrates an exemplary technique for applying the surface layers. Dispersion-hardened lead plate 81 is placed between thin sheets of lead 80, and a unitary structure is produced by conventional pressing or rolling. Those skilled in the art will appreciate that all bonding surfaces desirably are clean and free of oxide etc. FIG. 9 schematically depicts the resulting unitary structure.

If the dispersion-hardened material is formed by the above-described multi-layer process then it may be desirable to provide the lead surface material at an intermediate stage of the process. For instance, in the process illustrated by FIG. 6, the process could be arranged such that the outermost sheets remain uncoated.

The preferred use of the dispersion-hardened lead according to the invention is in electrode grid structures for lead-acid batteries. Such grid structures typically take the shape of a rectangular outer "picture frame" and a grid adapted for holding quantities of active material (e.g., $PbO_2$ and Pb, respectively) substantially as shown, for instance, in "Handbook of Batteries", D. Linden, editor, 2nd edition, McGraw-Hill, Chapter 24.

Electrode grid structures are made from dispersoid-containing lead by any appropriate process, e.g., by stamping from sheet produced as described above. Because of the much increased mechanical strength of the dispersoid-containing lead, the electrode thickness typically can be substantially reduced, as compared to prior art elemental Pb electrode grids or alloy grids. Since the dispersion-hardened Pb of the present invention can be made to be at least 30% stronger than the elemental Pb, and preferably at least 50% stronger and even more preferably at least 100% stronger, the electrode grid dimension can be reduced by essentially the same ratio of at least 30–100%, thus resulting in an improved battery energy density and a reduction in the amount of Pb.

The, typically conventional, step of making the electrode grid structure from the dispersion-hardened material according to the invention, is followed by a heat treatment. This heat treatment is a significant aspect of the invention and can substantially increase the corrosion resistance of the electrode structure.

The as-produced dispersion-hardened material according to the invention typically has, prior to the heat treatment, relatively small grain size, and consequently relatively low corrosion resistance. For instance, grain sizes are typically in the approximate range 0.5–10 $\mu$m for a dispersoid volume fraction in the range 2–10%, and an average dispersoid particle size of a few microns.

The heat treatment is selected to result in substantial grain growth in the dispersion-hardened material, typically such that average grain size in the material is at least 20 $\mu$m, preferably at least 50 $\mu$m or 100 $\mu$m. Those skilled in the art are familiar with techniques for determining average grain size of a polycrystalline material. Exemplarily, the average grain size is determined by the well known linear interception method.

Those skilled in the art will appreciate that, concerning surface corrosion, the meaningful grain dimension is the average grain diameter in the surface of the material, since it determines the total length of grain boundaries exposed to the corroding medium, i.e., to the sulfuric acid. Herein the "grain size" is the diameter of a circle of equal area as the grain in the surface, and the "average" grain size is the average of the diameters.

The heat treatment for grain growth is carried out at a temperature relatively close to the melting temperature of Pb, typically in the range 150–300° C., preferably 200–250° C. The heat treating time is at least 0.1 hour, preferably at least 1 hour, but in any case long enough to result in the desired average grain size of at least 20 $\mu$m. Desirably the heat treatment is carried out in an inert atmosphere, (e.g., $N_2$, Ar) or in vacuum.

If the dispersoid-containing Pb is covered with a Pb surface layer then the surface layer will typically provide primary protection against corrosion. However, it will typically still be highly desirable to provide a corrosion-resistant dispersoid-containing Pb core according to this invention, to provide corrosion resistance in the event of a failure of the surface coating. For instance, the presence of pinholes in the Pb surface layer can result in contact of the electrolyte with the underlying material, and could lead to corrosion of the underlying material, unless that material is itself corrosion resistant. The heat treated dispersoid containing Pb according to this invention is such material.

The heat treatment not only results in desirable grain growth but typically also improves the bonding of (optional) lead surface sheets to the dispersion-hardened sheet. Of course, it also results in desirable grain growth in the (optional) lead surface sheets, typically yielding an average grain size in the surface sheets of at least 50 $\mu$m, preferably at least 100 or 200 $\mu$m.

After completion of the heat treatment, the electrode structures are allowed to cool to room temperature, and are then ready for incorporation into lead-acid batteries. These batteries can be conventional, aside from the use of one or more electrode grid structures according to the invention. Typically the electrode grid structure holds Pb powder in the negative electrodes and $PbO_2$ powder in the positive electrodes. Spacers are provided to maintain the spacing between the various electrodes, and the electrodes are placed into a housing. Means for making electrical contact with the electrodes are provided, as is sulfuric acid electrolyte. Assembly can be conventional.

EXAMPLE 1

Elemental Pb powder (>99.9% purity) with an average particle size of 200 mesh (~74 $\mu$m) was mixed with 5 volume % of $TiO_2$ particles with an average particle size of ~2 $\mu$m. A small amount of acetone was used as a wet lubricant. After gentle but thorough mixing so that most of the Pb particles were coated with the $TiO_2$ particles, the mixture was dried overnight, press-deformed using a hydraulic press at a pressure of about 10,000 psi into a strip form, cut into four pieces, stacked up and press-deformed again (by ~75% reduction in overall thickness). This stack-up and deformation processing was repeated 8 times with the final strip thickness of ~1 mm. The $TiO_2$ particles were initially separated from the next layer of $TiO_2$ by a distance equivalent to the Pb powder diameter (~74 $\mu$m), but this distance was reduced, through the repeated processing steps described above, by a calculated factor of $(1/4)^8$ or roughly 1/65000, which is much less than the average inter-particle distance (about 5–6 $\mu$m) in an ideally uniform distribution of 5 volume % of 2 $\mu$m particles. This implies that an essentially complete mixing and uniform distribution of the dispersoid particles in Pb was achieved.

The deformation-processed composite strip was then subjected to a grain growth heat treatment at ~250° C. for 48 hrs in an argon atmosphere. The degree of mechanical strengthening by the addition of $TiO_2$ dispersoid particles was measured by using a Vickers Hardness Tester, and compared with that of prior art Pb and a commercial Pb-Ca-Sn alloy as shown in Table 1. The inventive $TiO_2$ dispersion-strengthened Pb exhibit significantly improved mechanical hardness, about twice that of pure Pb or the Pb-Ca-Sn alloy.

TABLE 1

Mechanical Hardness of Pb, Pb Alloy, and
Dispersion-Hardened Pb (After 250° C./48 h)

| Material | Vicker's Hardness |
| --- | --- |
| Pure Pb (prior art) | 5.2 |
| Pb-0.1% Ca-0.5% Sn-0.03% Al (prior art) | 6.4 |
| Pb-5% $TiO_2$ | 11.5 |
| Pb-5% $Al_2O_3$ | 17.2 |

EXAMPLE 2

Commercially available ultra-fine $Al_2O_3$ particles (~0.01 $\mu$m in average diameter) were procured from AESAR Corp. The $Al_2O_3$ particles, 5% in volume, were mixed with 200 mesh Pb powder and repeatedly deformation-processed, substantially as described in EXAMPLE 1. The total amount of compressive plastic deformation applied was again such that the inter-particle spacing between the $Al_2O_3$ particles is theoretically reduced to less than the calculated inter-particle spacing in an ideal distribution of 5% volume of 100 Å particles in a Pb matrix, which implies essentially uniform mixing. The dispersion of the $Al_2O_3$ particles dramatically improved the hardness of Pb. As shown in Table I, the hardness value in the $Al_2O_3$-Pb composite, after a 250° C./48 h grain growth treatment, was about 17.2. The reason why the $Al_2O_3$ dispersion yields higher strength than the $TiO_2$ dispersion is most likely due to the much smaller particle size of $Al_2O_3$ used, ~100 Å vs ~2 $\mu$m for the $TiO_2$. We believe that the movement of dislocations and grain boundaries for plastic deformation of Pb typically is more difficult for smaller sized, larger-numbered dispersoid particles, than it is for larger but fewer particles.

EXAMPLE 3

Twelve sheets of elemental Pb, each ~0.008" thick, 0.75" wide and 3.5" long, were spray coated on one side with ~2 $\mu$m size $TiO_2$ particles mixed with acetone. The coating thickness was selected to yield about 5% by volume of $TiO_2$ in the lead. The coated sheets were dried overnight, stacked up and wrapped with 0.008" thick elemental Pb sheet, press bonded and cold rolled from ~0.120" to ~0.015" thickness (~87% reduction in area), cut into 20 pieces and stacked up again to ~0.3" thickness followed by press bonding and cold rolling into a 0.015" thick sheet. The total reduction in thickness was by a factor of ~160. Thus the thickness of each Pb layer in the lamination composite structure (which is the inter-particle distance in the thickness direction) is reduced by a similar factor from ~0.008" (200 $\mu$m) to ~1.25 $\mu$m. The latter dimension, ~1.25 $\mu$m, is even smaller than the size of the $TiO_2$ particles, and is certainly smaller than the average inter-particle distance (5–6 $\mu$m) in an ideally uniform distribution of 5 volume % of 2 $\mu$m particles in the Pb matrix. The mechanical hardness of the so-processed dispersion hardened Pb is compared with that of pure Pb in Table II.

TABLE II

Mechanical Hardness of Pb and Dispersion-hardened
Pb Sheet Prepared by Lamination Rolling
(After 250° C./16 h Grain Growth Heat Treatment)

| Material | Vicker's Hardness |
| --- | --- |
| Pure Pb (prior art) | 5.2 |
| Pb-5% $TiO_2$ | 9.4 |

As is evident from Table II, the lamination-rolled, dispersion-hardened Pb exhibits substantial greater mechanical strength than the elemental Pb.

Figure 10:
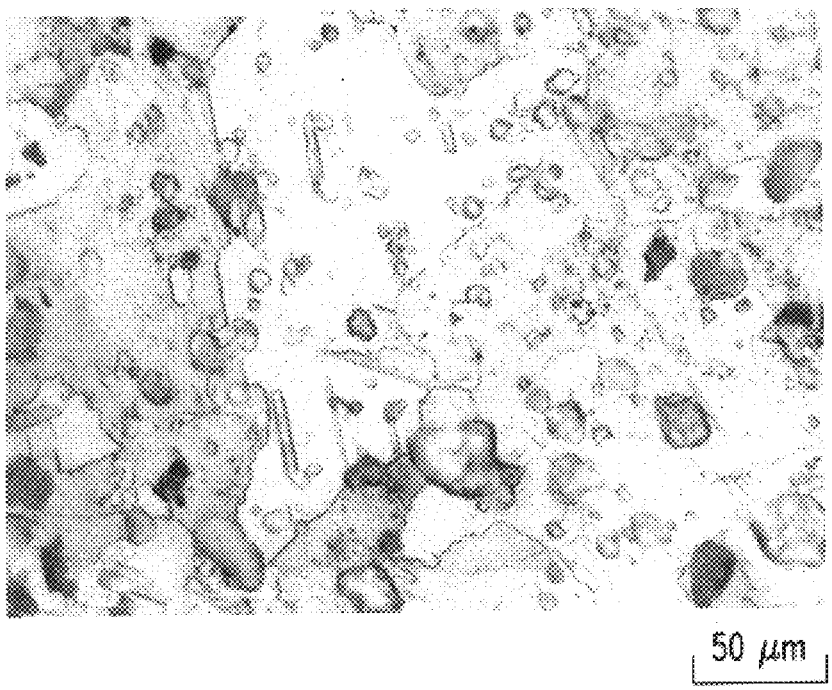
FIGS. 10–12 are micrographs showing the structure of heat treated dispersoid-containing lead.
Figure 12:
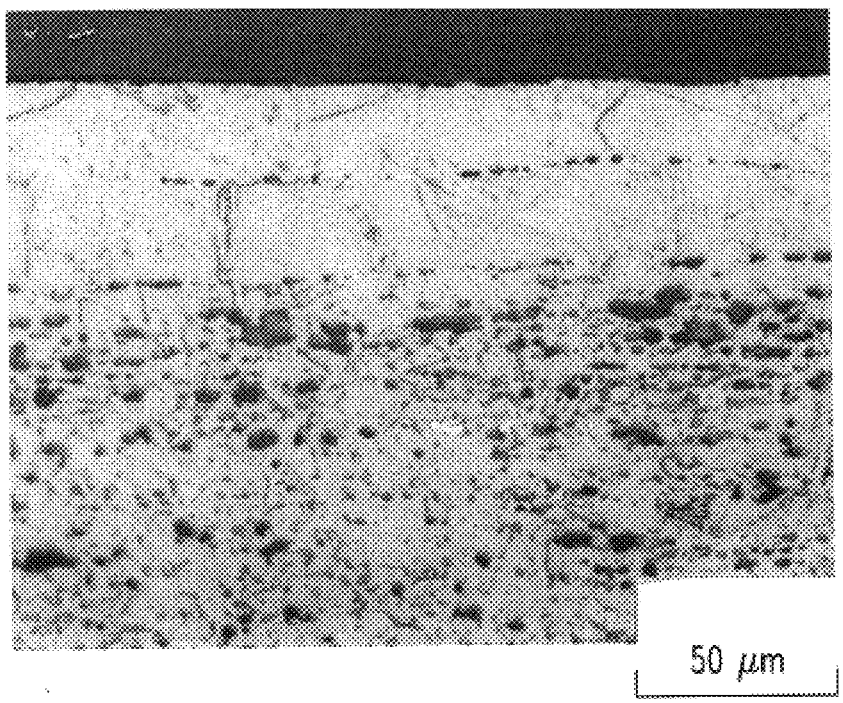
Figure 11A:
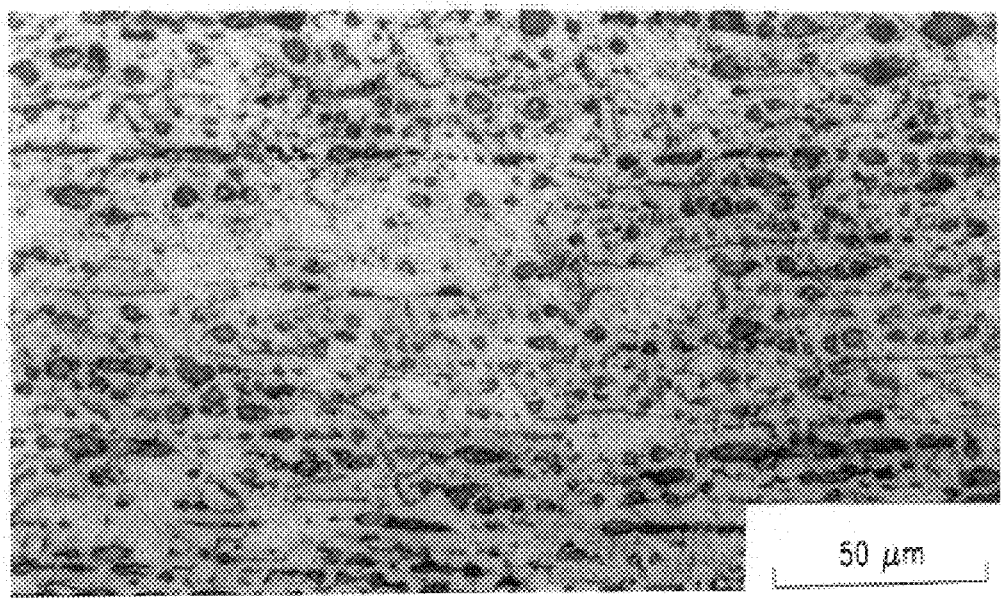
Figure 11B:
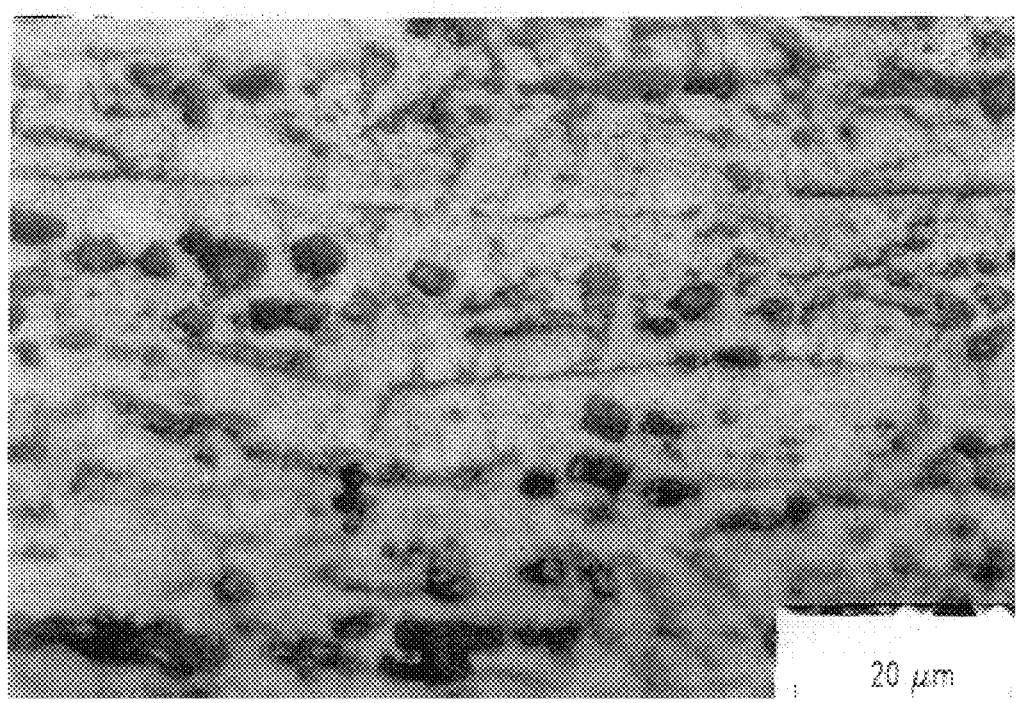

Shown in FIG. 10 is an optical micrograph of the dispersion-hardened and grain-growth annealed Pb of Example 3, taken at a magnification of x500. It shows a relatively uniform distribution of the $TiO_2$ particles and an average grain size of above 20 $\mu$m grain size. FIGS. 11a) and b) are cross-sectional photomicrographs of the same sample at x500 and x1000, showing the distribution of the $TiO_2$ dispersoid and a relatively large grain width of Pb. Shown in FIG. 12 is a cross-sectional photomicrograph of $TiO_2$ dispersion-hardened Pb with an additional surface lamination layer of corrosion-resistant pure Pb. The sample was produced by a technique substantially like that of Example 3.

The invention claimed is:

1. Method of making an article that comprises a dispersion-hardened lead member; characterized in that the method comprises a) forming a multilayer arrangement of lead sheets having thickness, with dispersoid particles disposed between adjacent lead sheets, said dispersoid particles selected from the inorganic materials that have solubility less than 0.5 atomic percent in lead and in sulfuric acid, both at a temperature in the range −20 to 70° C., and the sulfuric acid of concentration in the range 14–45% by weight;

b) subjecting the multilayer arrangement to a multiplicity of mechanical deformation steps selected to reduce the thickness of the lead sheets such that said dispersoid particles are substantially uniformly distributed in the lead;

c) forming said dispersion hardened lead member from the lead with the dispersoid particles distributed therein; and d) carrying out one or more further steps towards completion of the article.

2. Method according to claim 1, wherein said dispersoid particles are selected from the group consisting of oxides, nitrides and carbides.

3. Method according to claim 2, wherein the dispersoid particles are selected from the group consisting of $TiO_2$, $ZrO_2$, $Al_2O_3$, $PbSnO_3$, $PbTiO_3$, $BaPbO_3$, TiN, ZrN, AlN, TiC, ZrC, HfC, diamond and rare earth oxides, nitrides and carbides, where the rare earth's are the elements of atomic number 57–71.

4. Method according to claim 1, wherein the method is carried out such that the dispersion hardened lead member is at least partially surrounded by dispersoid-free lead having an average grain size of at least 50 $\mu$m.

5. Method according to claim 1, wherein said article is a lead-acid battery.

6. Method according to claim 1, wherein said dispersion hardened lead member has a Vickers hardness of more than 6.4 at room temperature.

7. Method according to claim 1, wherein said lead sheets have a thickness in the range 0.005–0.25 inches.

8. Method according to claim 7, wherein said lead sheets are work-hardened lead sheets.

9. Method according to claim 7, wherein both surfaces of a given lead sheet are coated with dispersoid particles.

10. Method according to claim 1, wherein a volume fraction of said dispersoid particles in said lead member is in the range 0.5–20%.

11. Method according to claim 1, comprising providing a multiplicity of lead sheets coated with dispersoid particles, wherein step b) comprises rolling the coated lead sheets.

* * * * *